United States Patent Office 2,910,432
Patented Oct. 27, 1959

2,910,432

DESULFURIZATION WITH FLUORINE-CONTAINING CATALYST AND REGENERATION OF CATALYST

Leslie Benjamin Witten and Ernest Carlton Housam, Sunbury-on-Thames, England, assignors to The British Petroleum Company Limited No Drawing. Application April 16, 1954
Serial No. 423,842

Claims priority, application Great Britain April 16, 1953

2 Claims. (Cl. 208—216)

This invention relates to the regeneration of catalysts of the kind used in hydrocarbon conversion and treating processes and which require to be regenerated, at intervals depending upon the nature of the particular reaction for which they are employed, by heating in an oxidizing atmosphere at an elevated temperature. In some cases, the catalyst may contain catalytically active components which are lost to a varying degree during the regeneration process, and the principal object of the present invention is to provide a method of regeneration which will avoid or at least reduce such loss.

The invention is particularly applicable to the regeneration of certain catalysts used in the autofining process for the desulfurization of petroleum distillates which is described inter alia in United States Patents Nos. 2,573,726, 2,574,445 and 2,574,448. As set forth in these foregoing patents, the temperature employed in the autofining desulfurization is in the range 650–800° F. The catalyst commonly employed in the autofining process comprises the oxides of cobalt and molybdenum supported on alumina and it is disclosed in the copending application Ser. No. 311,429, filed September 25, 1952, now Patent No. 2,800,429, that the addition of fluorine to the catalyst increases its dehydrogenating activity whereby increased sulfur removal can be obtained when autofining under the equilibrium pressure method of operation disclosed in United States Patent No. 2,648,623. It has been found that the catalyst loses fluorine during regeneration and although the rate of loss of fluorine is such that many regenerations can be carried out before the loss of fluorine is sufficient to cause a decline in catalyst activity, it is obviously of considerable practical importance to increase the number of regenerations that may be carried out before the addition of more fluorine is required. It is a particular object of the present invention to effect such an increase.

According to the invention, the regeneration of a catalyst which is effected by passing a stream of regeneration gases in contact with the catalytic material at an elevated temperature is carried out in such a manner that the direction in which the regeneration gases pass in contact with the catalyst is periodically reversed.

The greatest improvement is effected by reversing the direction of flow of the regeneration gases after each regeneration.

The improvement obtained by the method of regeneration according to the present invention may be briefly explained as follows with respect to a fluorine-containing catalyst, although it will be understood that the scope of the invention is in no way limited by such explanation.

If, at the start, the fluorine is evenly distributed throughout the catalyst mass, the effect of successive regenerations with the same direction of flow is to disturb the even distribution of the fluorine and to cause a migration of fluorine in the direction of the gas flow. If, on the other hand, the direction of flow is periodically reversed, the migration of fluorine is substantially prevented and more even distribution of the fluorine is maintained. Furthermore, it has been found that there is a lower overall loss of fluorine.

The invention will now be described with reference to the following example.

EXAMPLE

The catalyst employed was of the kind comprising the oxides of cobalt and molybdenum deposited on alumina and contained the following components.

| | G./100 g. |
|---|---|
| Molybdenum as $MoO_3$ | 17.3 |
| Cobalt as CoO | 4.3 |
| Fluorine | 1.92 |

The catalyst was used as follows:

A Kuwait gas oil of boiling range 250° C. to 350° C. in an Engler type distillation and specific gravity 0.8415 60° F./60° F., was processed over the catalyst at 780° F., at a liquid space velocity of 2 v./v./hr. and in the presence of 50 cu.ft./bbl. of hydrogen such that the total pressure was 50 p.s.i.g. After processing for a period of 2 hours in a downward direction, the hydrocarbon feed and gas flow were stopped, the unit depressured to atmospheric pressure and purged for 10 minutes with neat nitrogen. Air was then introduced with the nitrogen at such a rate that the catalyst temperature throughout the regeneration at no time exceeded 1050° F. When all the carbonaceous deposit had been burned off, the unit was purged with neat nitrogen and then with hydrogen before pressuring up and restarting the gas oil feed. Two sets of experiments, each consisting of ten such cycles, were carried out, the regeneration in the first set being downward only while in the second set the first regeneration was downward, the second upward and so on to the tenth which was upward. After each set of runs, the catalyst was removed from the reactor and divided into seven approximately equal portions representing adjacent sections of the bed, each being weighed and analysed for fluorine to give the following results.

Table

| | Direction of regeneration | |
|---|---|---|
| | Downward only, g./100 g. | Upward and downward alternately, g./100 g. |
| Zone 1 (top) | 0.8 | 1.4 |
| Zone 2 | 1.5 | 1.9 |
| Zone 3 | 1.6 | 1.9 |
| Zone 4 | 1.7 | 2.0 |
| Zone 5 | 1.8 | 2.0 |
| Zone 6 | 1.9 | 2.0 |
| Zone 7 (bottom) | 2.3 | 1.6 |
| Weighted mean | 1.64 | 1.82 |
| Percentage of original fluorine retained | 85.4 | 94.8 |

It will be noted that using alternate flow, the overall loss of fluorine is reduced and that a more even distribution of the fluorine throughout the catalyst bed is obtained.

We claim:

1. In a process for the hydrocatalytic desulfurization of petroleum hydrocarbons in which the temperature employed therein is in the range 650–800° F. and in the presence of a catalyst comprising oxides of cobalt and molybdenum supported on alumina and having fluorine contained therein, said catalyst being periodically regenerated by heating same to a regeneration temperature which is greater than the desulfurizing temperature employed and in a stream of oxidizing gas so that burning off of the deposit on the catalyst begins at one end of the catalyst mass and moves progressively along the mass, the regenerating temperature being substantially uniform throughout the burning zone that moves progressively down the catalyst mass, the step of periodically reversing the direction of flow of the stream of oxidizing gas passing in contact with one and the same mass of said catalyst undergoing regeneration whereby the overall loss of fluorine from the catalyst is reduced and a more even distribution of the fluorine in the catalyst bed is obtained.

2. In a process according to claim 1 wherein reversal of the direction of flow is effected with each succeeding regeneration.

References Cited in the file of this patent

UNITED STATES PATENTS

| | | |
|---|---|---|
| 2,313,661 | Montgomery | Mar. 9, 1943 |
| 2,324,746 | Weinrich et al. | July 20, 1943 |
| 2,495,262 | Keith | Jan. 24, 1950 |
| 2,505,871 | Trotter | May 2, 1950 |
| 2,606,141 | Myer | Aug. 5, 1952 |
| 2,642,384 | Cox | June 16, 1953 |
| 2,718,490 | Porter | Sept. 20, 1955 |
| 2,800,429 | Porter et al. | July 23, 1957 |